(12) United States Patent
Appleby

(10) Patent No.: US 6,299,917 B1
(45) Date of Patent: Oct. 9, 2001

(54) FOOD CASING FROM VISCOSE-SMOKE BLEND

(75) Inventor: Douglas E. Appleby, Danville, IL (US)

(73) Assignee: Teepak Investments, Inc., Wilmington, DE (US)

( * ) Notice: Subject to any disclaimer, the term of this patent is extended or adjusted under 35 U.S.C. 154(b) by 0 days.

(21) Appl. No.: 09/395,026

(22) Filed: Sep. 13, 1999

(51) Int. Cl.[7] ............................ A22C 13/00; A22C 13/02
(52) U.S. Cl. ...................... 426/105; 426/138; 426/277; 426/414; 426/513; 426/517
(58) Field of Search ..................... 426/124, 125, 426/129, 135, 250, 276, 652, 105, 277, 138, 414, 513, 514; 264/178 R, 177.14, 187, 188, 196

(56) References Cited

U.S. PATENT DOCUMENTS

| | | | |
|---|---|---|---|
| 3,123,782 | * 3/1964 | Lieberman | 99/176 |
| 3,235,641 | * 2/1966 | McKnight | 264/178 |
| 3,860,728 | * 1/1975 | Tanner et al. | 426/105 |
| 3,873,740 | * 3/1975 | Terrell | 426/212 |
| 3,894,158 | * 7/1975 | Miller | 428/277 |
| 4,104,408 | 8/1978 | Chiu | 426/135 |
| 4,442,868 | 4/1984 | Smith et al. | 138/118.1 |
| 4,446,167 | 5/1984 | Smith et al. | 426/650 |
| 4,504,500 | 3/1985 | Schneck et al. | 426/265 |
| 4,505,939 | 3/1985 | Chiu | 426/135 |
| 4,604,309 | 8/1986 | Goldberg | 428/36 |
| 4,657,765 | 4/1987 | Nicholson et al. | 426/250 |
| 4,717,576 | 1/1988 | Nicholson et al. | 426/533 |
| 4,781,931 | * 11/1988 | Jon et al. | 428/132 |
| 4,905,587 | 3/1990 | Smithers | 99/534 |
| 4,933,217 | 6/1990 | Chiu | 428/34.8 |
| 4,975,291 | * 12/1990 | Petrosillo | 426/76 |
| 5,449,318 | * 9/1995 | Halftown et al. | 452/50 |
| 5,599,570 | 2/1997 | Stribling | 426/105 |
| 5,795,605 | * 8/1998 | Morgan et al. | 426/277 |

FOREIGN PATENT DOCUMENTS

| | | |
|---|---|---|
| 0 315 965 | 5/1989 | (EP) . |
| 0 559 456 | 9/1993 | (EP) . |
| 0 933 028 | 8/1999 | (EP) . |
| 589274 | 6/1947 | (GB) . |

OTHER PUBLICATIONS

Merriam–Webster's Collegiate Dictionary, 10 Ed., (c) 1998, pp. 122 & 607.*

* cited by examiner

Primary Examiner—Nina Bhat
(74) Attorney, Agent, or Firm—Michael L. Dunn

(57) ABSTRACT

A food casing that is a tubular film having an internal cellulose surface containing smoke components integrally blended with the cellulose. The invention further includes the method for making the food casing of the invention by blending smoke, usually in the form of an aqueous solution or dispersion of smoke components (liquid smoke), into viscose prior to formation of the viscose into a film by extrusion and regeneration. The food casing of the invention consistently transfers smoke flavor and color to contained food product, has reduced odor, is not sticky, does not gum up processing machinery, does not have degraded color and flavor as a result of exposure to acid or caustic, is easily shirred, deshirred and unrolled, does not yield odiferous dark sticky liquid in premoisturized casing packages and can be readily peeled from processed food product.

16 Claims, No Drawings

FOOD CASING FROM VISCOSE-SMOKE BLEND

BACKGROUND OF THE INVENTION

This invention relates to tubular food casings, especially sausage casings, comprising a smoke component that will transfer smoke color and/or flavor to the surface of food products contained within the casing.

Food casings have been made from a variety of materials that are in tubular form or can be formed into tubes. Examples of such materials are natural gut, synthetic plastics, cellulose films, and fabrics. The materials may be reinforced with fibrous materials or may be unreinforced. The material primarily used for the manufacture of food casings is cellulose that is either precipitated from solution or regenerated from a solution of a cellulose derivative. Cellulose and derivatized cellulose solutions may collectively be referred to herein as "viscose". The term "viscose" as used herein is intended to mean a solution of either non-derivatized or derivatized cellulose in a suitable solvent, e.g. xanthated viscose in alkali, cellulose in amine oxide solution, cellulose amino methanate in alkali or cellulose in cupraammonium solution. Formation of cellulose by precipitation or regeneration from viscose is collectively referred to as regeneration, i.e. re-formation of solid cellulose from solution. Food casings made from film materials by precipitation of cellulose from solution or by regeneration of cellulose from a solution of a cellulose derivative, e.g. xanthate viscose, have been found to have many very good qualities. In particular cellulose is very hydroscopic while being completely water insoluble. Cellulose films have good smoke permeability. Cellulose films have good dimensional stability. Cellulose films have good strength and cellulose films can be made from readily available raw materials. Formation of cellulose film food casings from viscose has, however, been considered "touchy" since even slight changes in processing parameters can adversely affect film properties.

Smoke has long been applied to food products for purposes of flavor and preservation. Among such food products, sausages of various kinds have often been smoked. Traditionally when natural food casings, i.e. gut casings, were used, food product was stuffed into the casing and the resulting stuffed product, especially sausages, were smoked in a smoke house where the product was exposed to smoke vapors to impart smoke flavor, aroma and color to the contained food product. This process has continued to the present where products contained in food casing made of various natural and synthetic materials are exposed to smoke vapors. Such materials include collagen, synthetic plastics such as nylon and regenerated cellulose, i.e. cellulose regenerated from a solution of a cellulose derivative or cellulose precipitated from a solution of cellulose in a suitable solvent, e.g. tertiary amine oxide cellulose solution or cupraammonium cellulose solution. Any of such materials may be reinforced, e.g. with fibers blended into the material or in the form of a woven or felted web or mat impregnated with the material.

Such a smoke process for contained food, e.g. meat, product is costly and time consuming. In addition, all food casings are not suitable for such a process since smoke penetration through the casing to the food product may be poor or even non-existent. In addition, non-uniform product may result, e.g. due to the nature of the casing product. Such casing product may, for example, have areas of reduced smoke penetration, such as the seam area in fiber reinforced casing where the casing is thicker or printed casing where the smoke may not easily penetrate printed areas. In addition the amount of smoke application may depend upon the position of the stuffed food product in a smoke house where variations in smoke density are likely to occur.

Various attempts have been made to overcome the defects previously described. For example attempts have been made to directly incorporate smoke flavorants into sausage meat product. This in itself has several disadvantages. In particular, such incorporation does not simulate natural smoke flavor where smoke components are concentrated in the food product, e.g. meat or cheese, near the surface rather than being uniformly distributed through the food product. Concentration near the surface not only gives rise to a pleasant variation in flavor through the product but also results in a pleasing smoke color at the surface of the product. Any attempt to add smoke materials to food product sufficient to obtain such a smoke color therefore requires much more smoke than is necessary to obtain a similar depth of color by exposure to smoke vapor. This excess addition may result in an undesirable oversmoked flavor. Numerous attempts have been made to overcome this problem by adding dyes to food products, such as meat, which is viewed as undesirable and in some cases actually prohibited by law. Attempts have also been made to fractionate colorants from smoke without obtaining flavor components, which is time consuming, relatively more expensive and usually does not result in colorants having the same hue as unfractionated smokes.

It has been long known that smoke products could be applied to food casings to transfer smoke color, smoke flavor or both to products contained in the casing. Reference may for example be had to British Patent Specification 589,274, having a British filing date of Mar. 21, 1945. That British patent publication discloses applying smoky fractions of wood distillates into the film composition of a casing for sausage or other food product or onto the surface of such a casing to give a smoky odor and flavor to contained food product. The disclosure of the British Patent Application clearly contemplates that distillates are obtained by destructive distillation of wood followed by using fractions of such distillates for application into or on the food casing.

Such a process has deficiencies in that distillates are a complex mixture of substances some of which are tar-like materials, others of which are water insoluble liquids of various viscosities and other of which are water soluble or are at least water dispersible. It is therefore difficult to uniformly apply all distillate fractions to the surface of a food casing.

Attempts have also been made to use various modified and unmodified liquid smokes for application to meat products and food casings to obtain flavor or color. Liquid smokes are generally formed by passing smoke vapor through an aqueous system which absorbs components of the smoke. Numerous patents have been granted with respect to liquid smokes and their use. A few representatives of such liquid smoke patents are U.S. Pat. Nos. 4,104,408; 4,442,868; 4,446,167; 4,504,500; 4,505,939; 4,604,309; 4,657,765; 4,717,576; 4,905,587; and 4,933,217. There are problems associated with application of liquid smokes to food product which in many ways are similar to application of smoke distillates. For example, incorporation of liquid smoke into meat product gives rise to the same considerations as incorporation of smoke distillates, i.e. incorporation gives a uniform distribution which does not replicate surface application resulting from directly smoking with smoke vapor with respect to either flavor or color.

Additionally, due to effects of gravity and tendency for many liquid smoke compositions to separate, it is difficult to uniformly apply liquid smokes to the surface of either food product or food casings intended to transfer color or flavor to contained food product. In addition, transfer from food casings coated with a liquid smoke composition is not as good as desired.

Yet further, the use of liquid smokes on the surface of food casings results in food casings that are not uniformly smoke coated, sticky, difficult to shirr, that pollute and gum up rollers and other casing handling apparatus, that have a tendency to be self adherent thus causing inconsistent deshirring or unrolling on a food packaging machine, that exude an unpleasant smoke odor and that do not cleanly peel from contained food product after the food product is processed. Casings containing sufficient moisture to provide the flexibility needed for stuffing have an additional problem in that the surface smoke often results in unsightly and messy food casing packages containing residual smoke liquid that can and does easily leak or drip from the package when the package is opened to obtain the food casing for placement onto food stuffing equipment.

BRIEF DESCRIPTION OF THE INVENTION

The invention is a food casing comprising a tubular film having an internal cellulose surface containing smoke components integrally blended with the cellulose. The invention further comprises the method for making the food casing of the invention by blending smoke, usually in the form of an aqueous solution or dispersion of smoke components (liquid smoke), into viscose prior to formation of the viscose into a film by extrusion and regeneration. The food casing of the invention consistently transfers smoke flavor and color to contained food product, has reduced odor, is not sticky, does not gum up processing machinery, does not have degraded color and flavor as a result of exposure to acid or caustic, is easily shirred, deshirred and unrolled, does not yield odiferous dark sticky liquid in premoisturized casing packages and can be readily peeled from processed food product.

DETAILED DESCRIPTION OF THE INVENTION

In accordance with the invention, a food casing is provided that comprises a tubular film having an internal cellulose surface containing smoke components integrally blended with the cellulose.

Food casing, as used herein, means tubular food casing having at least an internal layer comprising regenerated cellulose. The tubular food casing may be made by extruding viscose into the shape of a tube followed by regeneration of cellulose from the viscose. The tubular food casing may also be made by coextrusion of viscose containing smoke components as an internal layer, with one or more other coextruded materials to form a layered food casing. The other coextruded materials may, for example, be viscose without smoke components or a synthetic polymer. In such coextruded food casings, the internal layer, i.e. the layer that will contact contained food, is always a mixture of viscose and smoke components. The tubular food casing may also be made by extrusion of viscose onto a reinforcing fiber web or mat rolled into a tubular shape. Such casings are known in the art as "fibrous" food casings. In accordance with the invention, the material extruded onto the inside of the web or mat is always a mixture of viscose and smoke components. Material extruded onto the exterior of the mat or web may be viscose, viscose mixed with smoke components or another extrudable film forming material. Tubular casing of the invention may also be made by rolling a flat film and seaming to form a tube. The film in such a case comprises cellulose regenerated from a mixture of viscose and smoke components and the internal surface of the tube is formed by a cellulose layer formed by regeneration of a mixture of viscose and smoke components. The flat film used in such a process may be a laminated film, e.g. a first layer of cellulose regenerated from a mixture of viscose and smoke components, a second adhesive layer and a third layer bound to the cellulose layer by the adhesive layer. The third layer may be essentially any film material, e.g. nylon, polyethylene, polyvinylidene chloride, regenerated cellulose, collagen or a metallocene resin. Such a laminated film is not restricted to three layers but may be any number of film layers that are self binding to each other or bound together by intermediate adhesive layers.

The internal surface may be the internal surface of a tubular cellulose food casing film containing smoke components uniformly distributed throughout the entire casing. Alternatively, the internal surface may be the internal surface of an internal layer of the casing, which internal layer comprises regenerated cellulose containing smoke components uniformly distributed through out the layer and the casing further comprises an external layer free of smoke components, e.g. when the casing is made by coextrusion of cellulose layers together, with or without reinforcement.

In order to obtain such a food casing, smoke components are blended with viscose prior to regenerating the cellulose. Upon regeneration, i.e. precipitation with removal of derivatizing groups, if present, the resulting food casing has smoke components uniformly distributed within at least an internal layer of the cellulose and will transfer smoke color and flavor to food product contained therein without disadvantages associated with prior smoke transfer food casings. The effective incorporation of smoke components, e.g. liquid smoke, into viscose to form a regenerated cellulose film food casing integrally containing smoke components, is very surprising since prior to the present invention, in view of the sensitivity of the viscose process, one would have expected the smoke to critically and adversely affect the properties of the cellulose film. Prior attempts to incorporate smoke into viscose resulted in gelling of the viscose. Such incorporation was made possible by the discovery that alkaline smoke, as opposed to commonly used acid liquid smokes, does not gel the viscose.

The smoke components uniformly distributed throughout the film usually comprises the solid components of liquid smoke as previously described. Such liquid smoke is preferably, but not always, alkali liquid smoke since it is compatible with the usually alkaline nature of viscose. The liquid smoke may also be other than alkali smoke, e.g. tar depleted liquid smoke provided that it has a sufficiently high pH to prevent gelling when added to viscose. Normally acid smokes may be used if they are made alkaline prior to incorporation.

The quantity of liquid smoke blended into the viscose prior to regeneration comprises from about 2 to about 25 grams and preferably from 5 to about 20 grams of liquid smoke per square meter of internal surface area of the finished casing. When alkaline liquid smoke is used, essentially as described in U.S. Pat. No. 4,446,167, at about 40 percent solids, the darkest smoke colored casings are made when from about 14 to about 25 grams per square meter of liquid smoke is used. Midrange color occurs at from about 10 to about 14 grams of the alkaline liquid smoke per square meter and light smoke color results when from about 2 to about 10 grams per square meter of the alkaline liquid smoke is used. The liquid smoke used is either originally alkaline or alkalized and usually contains from about 20 to about 60 weight percent and preferably contains from about 30 to about 50 weight percent of combined dissolved and suspended solids. After regeneration of the viscose, only the solids from the liquid smoke remain in the casing. Such solids leach into contained food product as a result of the presence of water and other liquid components subsequently added to the casing and/or present in the food product.

The food casing may be a shirred food casing and may be packaged within a moisture tight package, at a sufficient moisture to provide necessary plasticizing for stuffing.

The invention also includes a food product made by stuffing food product within a food casing of the invention to transfer smoke components from the casing to the food product, congealing the food product and removing the casing. The food product is usually congealed by heating and/or drying.

The following examples serve to illustrate and not limit the present invention. Unless otherwise indicated, all part and percentages are by weight.

In general, in the following examples, alkali liquid smoke was metered into a flow of xanthate viscose and mixed in line before reaching an extrusion die. Alkali liquid smoke having 40% solids (U.S. Pat. No. 4,446,167) was injected into the inside viscose flow using a static in-line mixer. Casing was made using a bilayer coextrusion die for application of viscose through inside and outside orifices. The liquid smoke was trapped within cellulose as it was regenerated from the viscose. In all examples, the odor of the smoke was lost in the first few wash tanks after initial regeneration which are ventilated away from the resulting food casing. The normal processing of the viscose creates a food casing product where the final smoke environment is the same as the casing. This eliminates degradation of the cellulose during storage due to extreme pH's encountered in smoke coated casing product and further eliminates negative interactions with carboxymethy cellulose (CMC) used in shirring solution by preventing conversion of the lubricating sodium CMC to acid CMC.

In the examples the coextrusion die was for a code 25 (34 mm dry flat width) food casing having a bone dry gauge of 18 grams of cellulose per 10 meters of food casing. The casing was made at a speed of 125 feet per minute (38.1 meters per minute and 2.6 square meters per minute) as measured at the dry machine end (the finished casing end of the machine).

Casing was made using a bilayer die for application of viscose through inside and outside orifices. Alkali liquid smoke (U.S. Pat. No. 4,446,167) was injected into the inside viscose flow using a static in-line mixer.

EXAMPLE 1

Viscose containing about 7.7% cellulose and was extruded at a rate of about 890.6 grams per minute (68.58 grams per minute of cellulose. One third of the cellulose was extruded inside and two thirds were extruded outside. Liquid smoke, pH 11, was injected into the inside viscose at a rate 106.5 ml per minute. The resulting dried casing had good strength, only minor smoke odor, a single thickness spectrophotometer light absorbance of 2.459 at 400 nm where absorbance is $\log_{10}(1/\text{transmittance})$ and an opacity reading of 0.34. The casing was shirred without difficulty into 125 foot strands. The resulting casing was stuffed on commercial stuffing equipment with chicken emulsion without leaving residual smoke on the equipment, cooked without any smoke and peeled without difficulty. The resulting chicken product had a deep, rich brown smoke color transferred to it from the casing.

EXAMPLE 2

Casing was made using a bilayer die for application of viscose through inside and outside orifices essentially as described in example 1, except that viscose flow to inner and outer layers was split 50:50 and alkali liquid smoke was introduced into the inner layer at a rate of 31 ml/min. The absorbance of the resulting casing at 400 nm was 0.401 and the opacity was 0.09. The casing had good strength, was not tacky and had very minimal smoke odor. The casing imparted a smoke color and flavor to chicken emulsion that was stuffed into the casing, cooked and peeled.

EXAMPLE 3

Example 2 was repeated except that liquid smoke was introduced into the inner layer at a rate of 14 ml/min. The absorbance of the resulting casing at 400 nm was 0.225 and the opacity was 0.07. The casing had good strength, was not tacky and had very minimal smoke odor. The casing imparted a smoke color and flavor to chicken emulsion that was stuffed into the casing, cooked and peeled.

EXAMPLE 4

Example 1 was repeated except that a single layer die was used and liquid smoke was introduced into the full thickness of the film at a rate of 31 ml/min. The resulting casing had a single thickness absorbance of 0.572 at 400 nm and an opacity of 0.09. The casing had good strength, was not tacky and had very little smoke odor. The casing imparted a smoke flavor and color to chicken emulsion stuffed into the casing, cooked and peeled.

EXAMPLE 5

Example 4 was repeated except that 14 ml/min. of liquid smoke was used. The resulting casing had a single thickness absorbance of 0.394 at 400 nm and an opacity of 0.07. The casing had good strength, was not tacky and had very little smoke odor. The casing imparted a smoke flavor and color to chicken emulsion stuffed into the casing, cooked and peeled.

What is claimed is:

1. A food casing comprising a tubular film having an internal regenerated cellulose surface containing smoke components integrally blended with the cellulose, wherein the cellulose is regenerated from viscose containing smoke components which do not gel the viscose.

2. The food casing of claim 1 wherein the internal cellulose surface is the internal surface of an internal layer of cellulose containing smoke components integrally blended with the cellulose.

3. The food casing of claim 1 wherein the food casing is a fibrous food casing.

4. The food casing of claim 1 wherein the blended smoke components comprise alkali liquid smoke.

5. The food casing of claim 1 wherein the blended smoke components comprise tar depleted liquid smoke having a pH of at least 9.

6. The food casing of claim 1 wherein the food casing contains from about 5 to about 20 grams of liquid smoke per square meter of internal surface area of the casing.

7. The food casing of claim 3 wherein the liquid smoke contains from about 20 to about 60 weight percent of combined dissolved and suspended solids.

8. The food casing of claim 7 wherein the food is a shirred food casing.

9. The food casing of claim 7 wherein the food casing is contained, at a sufficient moisture for stuffing, within a moisture tight package.

10. The food casing of claim 1 stuffed with food product.

11. The food casing of claim 1 wherein the food product is sausage meat.

12. A food product made by stuffing food product within a food casing of claim 1 to transfer smoke components from the casing to the food product, congealing the food product and removing the casing.

13. The food product of claim 12 wherein the food product is congealed by heating.

14. The food product of claim 12 wherein the food product is congealed by drying.

15. The food product of claim 12 wherein the food product is congealed by a combination of heating and drying.

16. A method for making the food casing of claim 1 which comprises mixing liquid smoke into viscose, extruding the viscose through a die to form a tubular film having an internal surface comprising a mixture of viscose and liquid smoke, and coagulating and regenerating the viscose to form a tubular film.

* * * * *

UNITED STATES PATENT AND TRADEMARK OFFICE
CERTIFICATE OF CORRECTION

| | | |
|---|---|---|
| PATENT NO. | : 6,299,917 B1 | Page 1 of 1 |
| DATED | : October 9, 2001 | |
| INVENTOR(S) | : Douglas E. Appleby | |

It is certified that error appears in the above-identified patent and that said Letters Patent is hereby corrected as shown below:

<u>Claim 8,</u>
Line 1, please add the word "casing" after the second occurrence of the word food.

Signed and Sealed this

Sixteenth Day of April, 2002

*Attest:*

JAMES E. ROGAN
*Attesting Officer*     *Director of the United States Patent and Trademark Office*